March 23, 1937.  H. ZIEBOLZ ET AL  2,074,883
METHOD OF AND APPARATUS FOR CONTROLLING THE FLOW OF FLUIDS
Filed Feb. 17, 1936  3 Sheets-Sheet 1
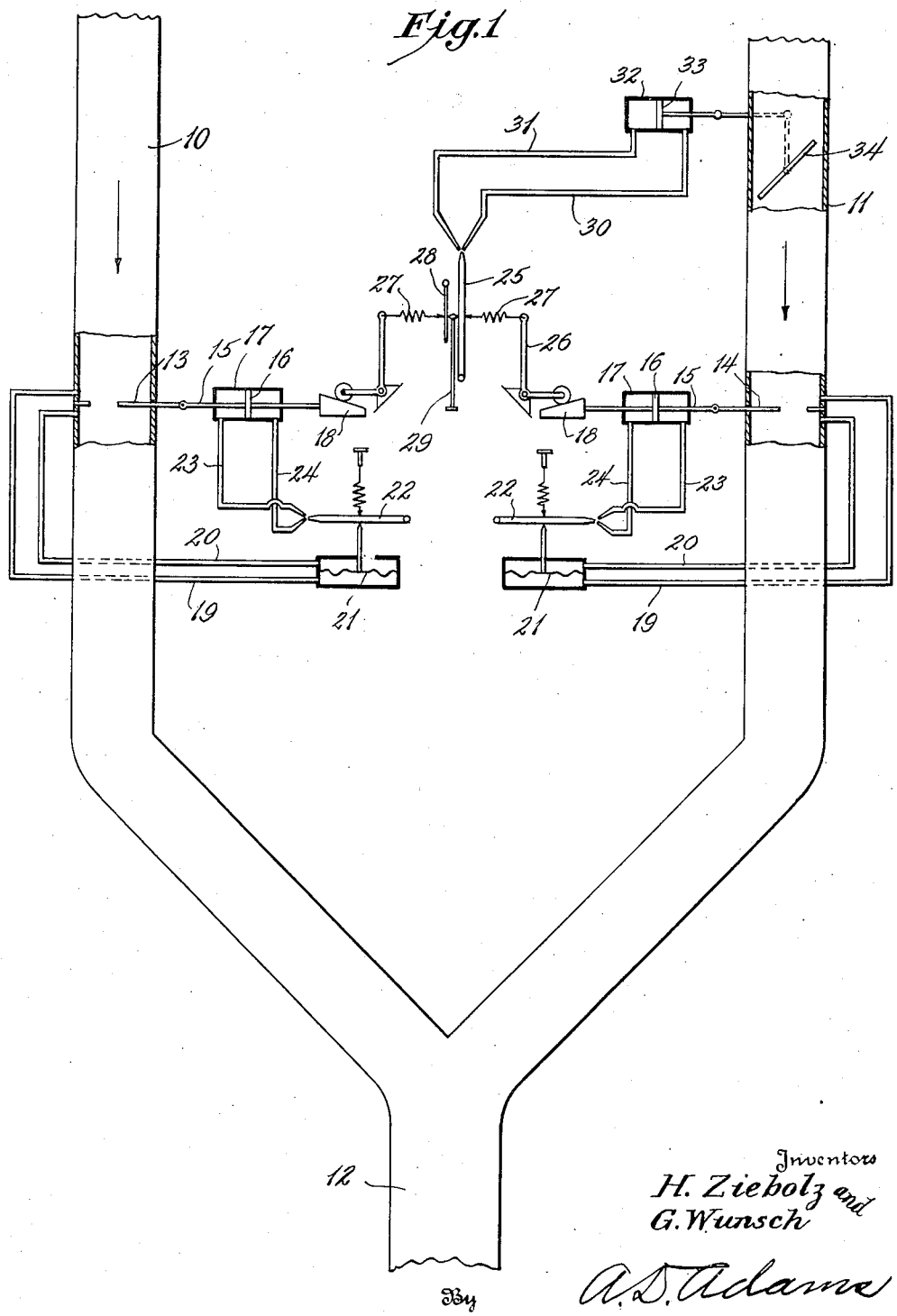
Inventors
H. Ziebolz and
G. Wunsch
By A. D. Adams
Attorney

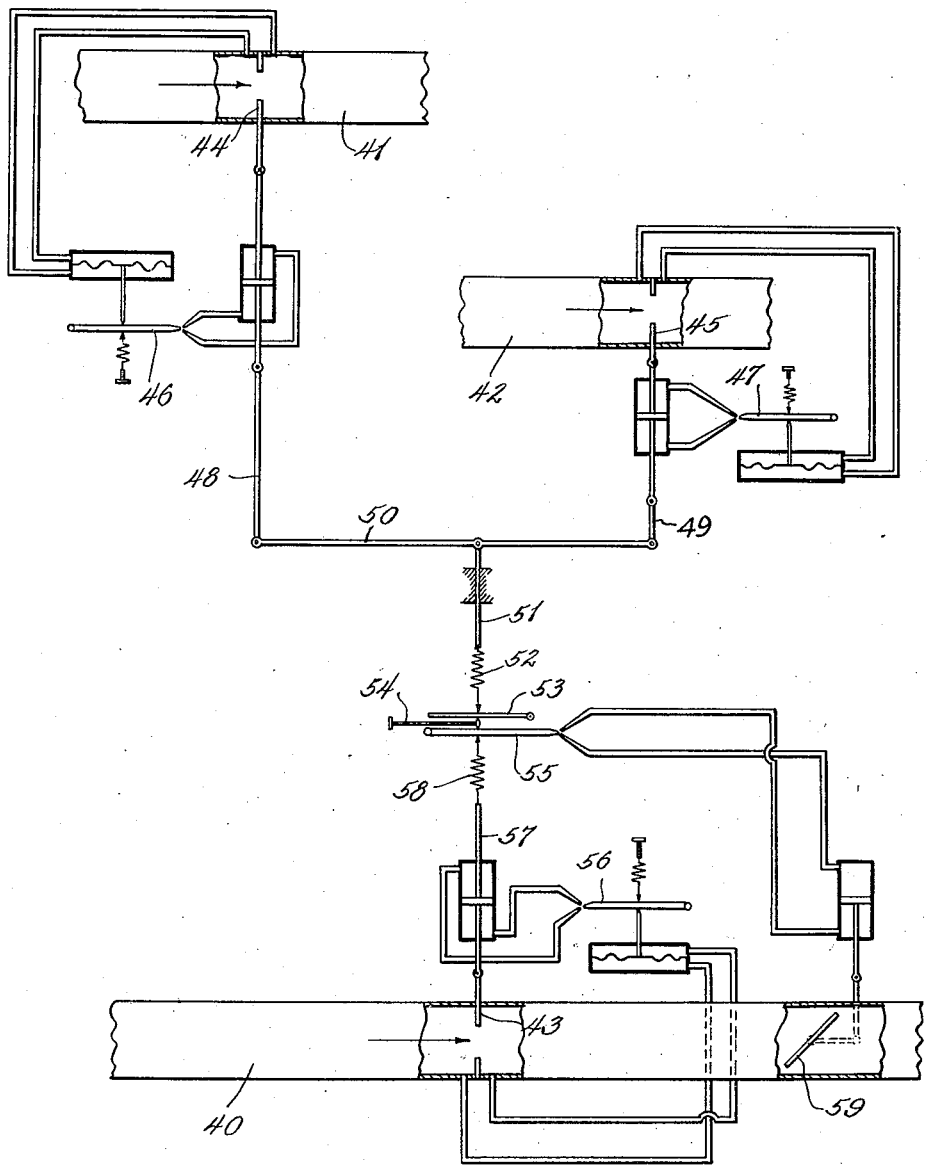

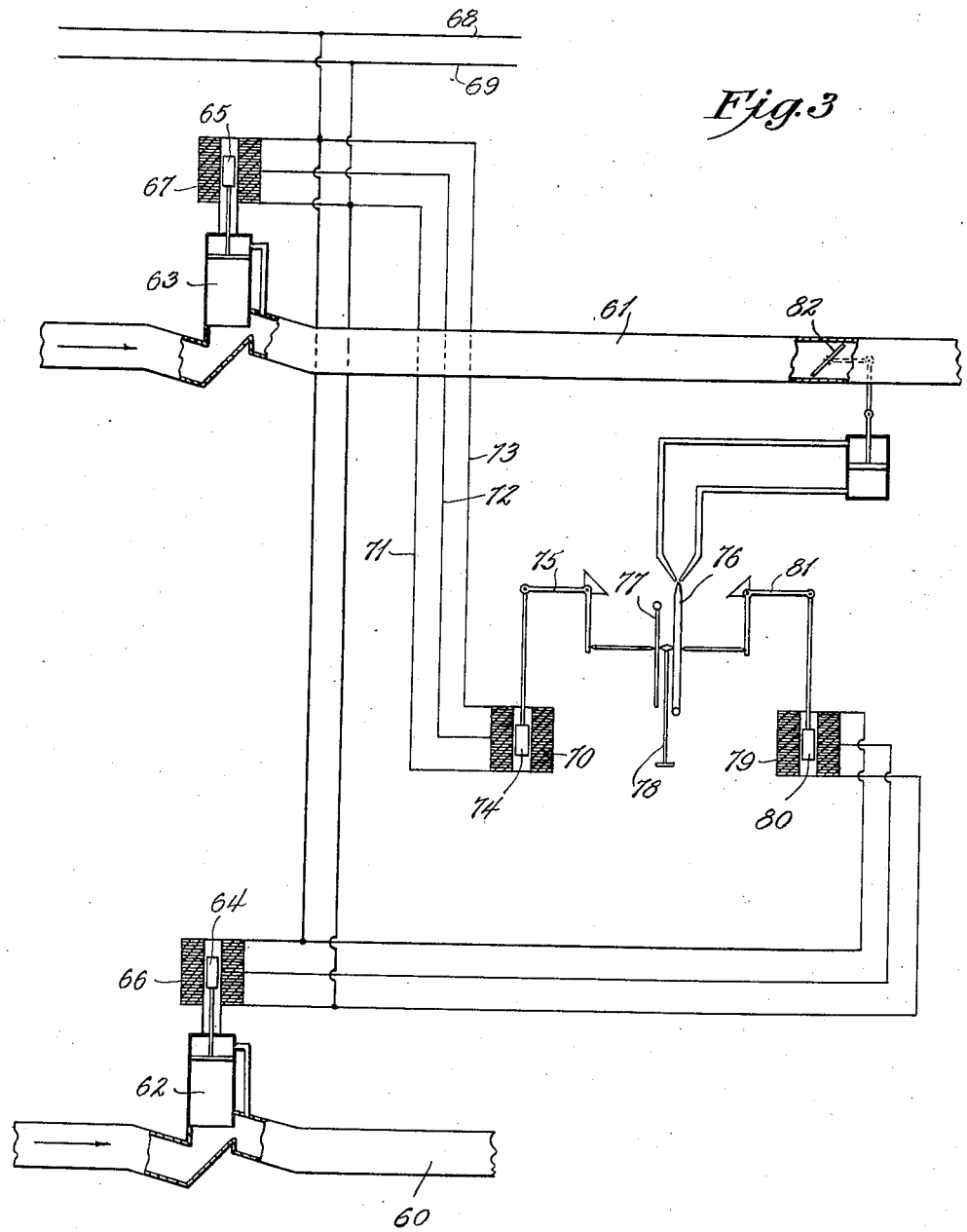

Patented Mar. 23, 1937

2,074,883

UNITED STATES PATENT OFFICE 2,074,883

METHOD OF AND APPARATUS FOR CONTROLLING THE FLOW OF FLUIDS

Herbert Ziebolz, Chicago, Ill., and Guido Wünsch, Berlin-Steglitz, Germany, assignors to Askania-Werke A. G. vormals Central Werkstatt Dessau und Carl Bamberg-Friedenau, a company of Germany Application February 17, 1936, Serial No. 64,378

12 Claims. (Cl. 137—164)

This invention relates to a method of and apparatus for controlling the flow of separate fluent materials or fluid media such as gases and liquids and, among other objects, aims to provide a greatly improved method of maintaining any desired ratio between the flows of separate fluids by maintaining substantially constant pressure differentials on the opposite sides of variable orifice plates and creating governing impulses which are a function of the orifice plate openings. The main idea is to increase the range and sensitivity of ratio controls applied to the proportioning of separate fluids to each other or a series of fluids with respect to each other. Also, it aims to provide relatively simple apparatus to control one fluid in proportion to a function of the flows of a plurality of other fluids. Further, the invention provides important improvements on the ratio control devices disclosed in the patents to Lundgaard No. 1,333,986 and Wünsch No. 1,558,529.

Other aims and advantages of the invention will appear in the specification, when considered in connection with the accompanying drawings, wherein:

Fig. 1 is a diagrammatic illustration of one form of apparatus for controlling the flows of two fluids which are adapted to be mixed;

Fig. 2 is a diagrammatic illustration of another embodiment of the control apparatus applied to three fluids; and Fig. 3 is a diagrammatic illustration of a modified form of apparatus.

In accordance with the well known method of measuring the flow of fluids, the pressure drop or pressure differential across a fixed restriction is measured. The impulses change with the second power of the flow and therefore the accuracy of the measurement decreases considerably with decreases in flow. For example, if the flow is decreased to, say, one tenth of the maximum, the magnitude of the impulses will be one hundredth of the maximum impulse. It is practically impossible to produce accurate and dependable apparatus which is sufficiently sensitive and rugged to take care of very wide ranges of impulses.

The present invention provides a method and apparatus which eliminates the necessity of employing delicate measuring instruments. By employing variable orifice plates of the well known type, the pressure drop or pressure differential across them can be kept substantially constant, or made any desired function of the rate of flow, depending upon the shape of the orifice or on the loading arrangement for the differential pressure regulator. A controlling impulse is then created which is a function of the variable orifice opening. This new method has two advantages, one being that the pressure loss for the maximum flow can be made small as compared with the loss across a fixed orifice, and the other being that the constant differential pressure permits the use of control instruments which would not be sufficiently sensitive for wide variations in impulse forces.

Referring particularly to the drawings, Fig. 1 shows an embodiment of the control apparatus for maintaining the ratio of two fluids, such as gas and air under constant pressures at their sources, passing through conduits 10 and 11, respectively, and mixed in a common conduit 12. In this instance, variable orifice plates 13 and 14 are employed in the branch conduits. By dimensioning the orifice plates correctly and controlling the differential pressure across them, it is possible to make their movement any function of the flow, more especially, directly proportional to the rates of flow through the branches. Each of the orifice plates is connected to a piston rod 15 which carries a piston 16 within a cylinder 17 and projects through the cylinder, terminating in a cam block 18. The differential pressure across each orifice plate is measured by a pair of conduits 19 and 20 connected to the branch pipes 10 and 11 on opposite sides of the plates. This pressure is utilized to operate a suitable regulator having a diaphragm 21 which, in this example, is connected to a spring balanced jet pipe 22 of the "Askania" type. However, other known types of regulators may be employed. The jet pipe discharges into one or the other of a pair of conduits 23 and 24 communicating with the opposite ends of the cylinder 17. Thus, when the differential pressure varies between limits determined by the strength of the spring acting on the jet pipe, the piston within each cylinder will be operated to vary the position of the respective orifice plates. The two cam blocks 18 are shown as being arranged opposite each other and operate a regulator which includes a third "Askania" jet pipe 25 through bell crank arms 26, and springs 27, a counterlever 28 and a ratio adjuster or slider 29 being provided on one side of the jet pipe. This jet pipe discharges into one or the other of a pair of conduits 30 and 31 leading to the opposite ends of a cylinder 32 to control the movement of a piston 33 which is connected to a control device, such as a butterfly valve 34, in one of the branches. This butterfly valve may be in either of the branches and directly controls the ratio or relative quantities of the two fluids according to the ratio of the rate-of-flow impulses which are obtained from the movements of the variable orifice plates. The compression of the springs 27 is determined by the shape of the cams 18 and the springs are preferably made so that the compressions are directly proportional to the respective flows. This means that the two opposing forces acting on the ratio control or regulator are always directly proportional to the respective flows, while in the standard form of diaphragm operated ratio control regulators, such as those shown in the aforesaid patents, these two forces, deriving their impulses from the pressure drop across constant orifices, are proportional to the second power of the flows. If these cams are made adjustable, corrections can be made for slight discrepancies in the proportionality of impulses to the respective flows. This mode of modifying the impulses derived from the adjustable orifice plates should be treated as being within the scope of the invention. It is also obvious that the same result may be obtained by resetting the compression springs of the differential pressure regulators in proportion to the movements of the orifice plates.

The advantage of this type of control is to materially increase the operating range and sensitivity of the control mechanism. At the same time, it permits the use of the movements of the adjustable orifice plates to measure the respective flows. Furthermore, it has the advantage of reducing the pressure drop through the branches when operating at high loads, which means economy in power consumption required for the supply pumps or fans. It is, of course, to be understood that the static pressure in the branches has to be substantially constant and, if necessary, will be regulated by suitable pressure controls (not shown).

A further and important advantage of the control mechanism resides in the great increase in the range of ratios possible to obtain. In this case, the ratio range obtained by adjustment of the ratio slider 27 relative to the levers 28 and jet pipe 25 is directly proportional to actual rates of flows of the fluids; whereas, the same adjustment of the ratio slider in the aforesaid Wünsch patent is only proportional to flow ratios which are directly proportional to root values of the opposing forces or the lever ratios. This is especially useful in producing fuel mixtures of constant B. t. u. content when the heating values of the component fuels vary over a wide range. It is also obvious that, by modifying the impulses representing the respective rates of flows, it is possible to utilize the control device to obtain a mixture which is a function of the rate of flow of the fluid in the branch 10.

In Fig. 2, there is shown an arrangement of control apparatus wherein the flow of one fluid is controlled in accordance with the sum of the flows of two other fluids; although it may be used to totalize any number of fluids. For example, the air supply through a conduit 40 may be controlled in proportion to the total of gas flow in conduit 41 and the flow of another gas in conduit 42. In this example, the regulators have variable orifice plates 43, 44 and 45, respectively. The orifice plate 44 is controlled by an "Askania" jet pipe system, generally designated 46 and the variable orifice plate 45 is controlled by an "Askania" jet pipe system 47. The pistons of these two regulators are connected to links 48 and 49, respectively, and the movements of these pistons are summarized or totalized mechanically through a common lever 50 imparting the resultant of the movements to a reciprocating rod 51 acting through a spring 52, counterlever 53 and ratio slider 54 on one side of a jet pipe regulator 55; while the regulator 56 for the variable orifice plate 43 has a piston rod 57 acting through a spring 58 to counterbalance the jet pipe 55. The pet pipe 55 acts to control the butterfly valve 59 in the air conduit 40 in the same manner as explained in connection with the butterfly valve 34 in Fig. 1. The movement of the piston rod 57 is proportional to the flow of air through the conduit 40 which, in turn, is controlled by the butterfly valve. The ratio slider 54 permits wide variations of the ratio adjustment of the regulator for the butterfly valve, as hereinbefore explained. As the movement of the rod 51 represents the total of the gas flow through the conduits 41 and 42, the amount of air which is controlled by the butterfly valve will always be proportional to the total of both rates of flow and perfect combustion will be maintained at all rates of flows. It will, of course, be evident that other methods of obtaining an impulse on the butterfly regulator representing the summation of flows of two gases may be employed. Also, it will be understood that the summation of flows of fluids in more than two pipes or conduits may be obtained and the resultant of the forces applied to the regulator which governs the flow of air or any other fluid. Moreover, forces representing any function of the flows could be created by modifying the movement of the variable orifice plates which represent the flows. It is also possible to obtain impulses wihch represent the difference between rates of flows by changing the lever arrangement in a well known manner and to balance such impulses against other flow impulses.

In Fig. 3, there is shown a modified form of control apparatus employing the well known "Brown area type flow meters" in separate fluid pipes or conduits 60 and 61. In this instance, piston valves 62 and 63 in the respective conduits have rectangular openings so that their movements will be directly proportional to the rates of flows, as the differential pressures are maintained constant by such movements. These valves carry connected cores or armatures 64 and 65 which operate in magnetic or induction coils 66 and 67 respectively and each coil is connected to a source of alternating current by the conductors 68 and 69. The coil 67 is connected in parallel with a similar induction coil 70 by three conductors 71, 72 and 73 and this receiving coil carries a core or armature 74 which operates a bell crank 75 and acts on a jet pipe regulator 76 through a counterlever 77 and ratio slider 78. When the armature 65 moves in the coil 67, due to a change in the position of the piston valve 63, it changes the electrical balance of the induction coils 67 and 70 and thereby creates a force which acts on the receiving armature and is transmitted by it to one side of the jet pipe. The other side of the jet pipe is acted upon by a similar receiving coil 79 connected to the coil 66 and having a core 80 acting on the regulator jet pipe through a bell crank 81 thereby balancing forces transmitted through the induction coils to the regulator and the regulator controls the operation of the butterfly valve 82 in the conduit 61. This is an example of another way of obtaining and transmitting impulses which are proportional to fluid flows, to a regulator for controlling the ratio. Obviously, induction coils could be employed instead of diaphragms or the like for controlling the operation of a plurality of regulators such as are shown in Fig. 2.

In all of the illustrated examples, it will be noted that the ratio control is governed by impulses or movements which are proportional to the rates of flows through the orifices because the differential pressures are maintained substantially constant by the variable orifice plates. This is one of the most important features of the invention and is a departure from the method generally employed. The apparatus is relatively simple and is capable of a wide variety of changes and uses.

Obviously, the present invention is not restricted to the particular apparatus illustrated for practicing the method; but said apparatus is capable of various embodiments. Moreover, it is not indispensable that all parts of the separately disclosed apparatus shall be used conjointly, but they are capable of embodiment in various combinations and sub-combinations.

What is claimed is:

1. That method of controlling the flow of two separate fluids under pressure passing through conduits and adapted to be mixed, which is characterized by passing the fluids through variable orifice plates in the respective conduits; maintaining the differential pressures on opposite sides of the respective orifices substantially constant by varying the sizes of the orifices; creating governing impulses by the movement of the variable orifice plates which are a function of the rates of flow through the orifices; and applying said governing impulses to maintain a predetermined ratio between quantities of the fluids delivered through the orifices.

2. Apparatus for controlling the ratio of flow of two fluids under pressure comprising, in combination, a pair of conduits through which the fluids are delivered; a variable orifice plate in each conduit; regulating means for varying the opening of each orifice plate for maintaining a substantially constant pressure differential on opposite sides of the orifice plate; means associated with the respective orifice plates to create governing impulses which are a function of the openings of the respective orifice plates; and control means in one of said conduits connected to be actuated by said governing impulses.

3. Apparatus for controlling the ratio of flow of two fluids comprising, in combination, a pair of conduits through which the fluids are delivered; a variable orifice plate in each conduit; regulating means for varying the opening of each orifice plate for maintaining a pressure differential on opposite sides of the orifice plate; means associated with the respective orifice plates to create governing impulses which are a function of the openings of the respective orifice plates; a regulator operated by said governing impulses; and fluid control means in one of said conduits operated by said regulator.

4. Apparatus for controlling the ratio of flow of two fluids comprising, in combination, a pair of conduits through which the fluids are delivered; a variable orifice plate in each conduit; regulating means for varying the opening of each orifice plate for maintaining a substantially constant pressure differential on opposite sides of the orifice plate; cams operatively connected to said orifice plates; a regulator connected to be controlled by said cams; and a control device in one of said conduits connected to be operated by said regulator.

5. Apparatus for controlling the ratio between the flow of a single fluid and the total of a plurality of separate fluids comprising, in combination, conduits having variable orifices through which the respective fluids are delivered; regulators for controlling the orifices in the conduits for the separate fluids to maintain the differential pressures across the orifice plates constant; means connected to the regulators to create a resultant governing impulse which is proportional to the total flow of said separate fluids; a regulator for controlling the orifice in the conduit for said single fluid to maintain the differential pressure across the orifice constant and connected to create a second governing force; a ratio regulator controlled by said two governing forces; and a valve in the conduit for said single fluid controlled by said ratio regulator.

6. That method of controlling the ratio of the flow of a first fluid to the sum of the flows of a plurality of second fluids which consists in passing the fluids through variable constrictions; maintaining the differential pressure across said constrictions constant by varying the openings of said constrictions; creating controlling impulses which are a function of the openings of said constrictions; and applying said impulses to vary the flow of the first fluid in response to deviations of the ratio of the first impulse to the algebraic sum of the second impulses from a predetermined value.

7. That method of controlling the ratio of the flow of a first fluid to the flow of a second fluid which consists in passing the fluids through variable constrictions; maintaining the pressure drop across said constrictions constant by varying the openings of said constrictions; creating controlling impulses which are a function of the openings of said constrictions; and applying the impulses to vary the flow of the first fluid in response to deviations of the ratio of the first to the second impulse from a predetermined value.

8. That method of maintaining a predetermined ratio between the flow of one fluid and a plurality of different fluids, all passing through conduits, which is characterized by discharging the respective fluids through variable orifices in their conduits; maintaining the differential pressure on opposite sides of the respective orifices substantially constant by varying the sizes of the orifices; creating governing impulses which are a function of the openings of said orifices; applying said governing impulses to create a resultant governing impulse; counteracting said resultant impulse by the impulse which is a function of the orifice opening in said first named fluid conduit; and controlling the flow of the first fluid by variations in said counteracting forces.

9. Apparatus for controlling the flow of two fluids, comprising, in combination, a pair of conduits for the fluids; variable orifice plates in said conduits; regulators connected to be controlled by the differential pressure across the respective orifice plates for varying the opening of said orifice plates to maintain a constant differential pressure across the same; cams connected to be operated in response to the variation of the openings of the respective orifice plates; a ratio regulator controlled by said cams; and a flow control device in one of said conduits operated by said ratio regulator.

10. Apparatus for controlling the ratio of the flow of a first fluid to the sum of the flows of a plurality of second fluids, comprising, in combination, conduits for the fluids; a variable orifice plate in each of said conduits; regulators connected to maintain the differential pressure across said orifice plates constant by varying the openings of the same; means connected to said orifice plates to create governing impulses which are a function of the openings of the respective orifice plates; a regulator responsive to deviations of the ratio of the impulse of the first fluid to the algebraic sum of the impulses of the second fluids from a predetermined value; and a flow varying device in the conduit for the first fluid connected to be controlled by said last named regulator.

11. Apparatus for controlling the ratio of two fluids flowing through separate conduits, comprising, in combination, a variable constriction in each conduit; means responsive to the differential pressure across said constriction for varying the opening of said constriction to maintain the pressure differential constant; means for creating electrical impulses which are a function of the openings of the respective constrictions; a ratio regulator connected to be controlled by said electrical impulses; and a valve in one of the conduits connected to be operated by said regulator.

12. That method of controlling the ratio of the flow of a first fluid to the total flow of at least one second fluid which consists in passing the fluids through conduits having variable constrictions; maintaining the differential pressure across said constrictions substantially constant by automatically varying the openings of said constrictions; creating controlling impulses which are a function of the openings of the respective constrictions; and applying the impulses to vary the flow of the first fluid in response to deviations of the ratio of the first to the second impulse from a predetermined value.

HERBERT ZIEBOLZ.
GUIDO WÜNSCH.